(12) United States Patent
Inoue et al.

(10) Patent No.: US 8,633,971 B2
(45) Date of Patent: Jan. 21, 2014

(54) LIQUID CRYSTAL SHUTTER AND IMAGE DISPLAY OBSERVATION SYSTEM

(75) Inventors: Yuichi Inoue, Kanagawa (JP); Eri Fukumoto, Kanagawa (JP); Tsuyoshi Kamada, Kanagawa (JP); Ryo Ogawa, Tokyo (JP); Yuji Nakahata, Kanagawa (JP)

(73) Assignee: Sony Corporation (JP)

(*) Notice: Subject to any disclaimer, the term of this patent is extended or adjusted under 35 U.S.C. 154(b) by 595 days.

(21) Appl. No.: 12/661,963

(22) Filed: Mar. 26, 2010

(65) Prior Publication Data

US 2010/0259601 A1 Oct. 14, 2010

(30) Foreign Application Priority Data

Apr. 9, 2009 (JP) ................ P2009-095168

(51) Int. Cl.
*H04N 13/04* (2006.01)
(52) U.S. Cl.
USPC ............ 348/51; 348/E13.04; 349/13; 349/62; 349/96; 428/172; 428/143
(58) Field of Classification Search
USPC ........... 348/51, E13.04; 349/13, 96; 428/172, 428/143
See application file for complete search history.

(56) References Cited

U.S. PATENT DOCUMENTS

| | | | | |
|---|---|---|---|---|
| 5,699,133 | A * | 12/1997 | Furuta | 349/13 |
| 8,236,408 | B2 * | 8/2012 | Matsui et al. | 428/172 |
| 2001/0010508 | A1 * | 8/2001 | Kakeya | 345/9 |
| 2007/0081115 | A1 * | 4/2007 | Wada et al. | 349/96 |
| 2008/0106672 | A1 * | 5/2008 | Kim et al. | 349/62 |

FOREIGN PATENT DOCUMENTS

| | | |
|---|---|---|
| JP | 03105310 | 5/1991 |
| JP | 07209623 A | 8/1995 |
| JP | 08171098 A | 7/1996 |
| JP | 08-327949 A | 12/1996 |
| JP | 09-113864 A | 5/1997 |
| JP | 3075913 U | 3/2001 |
| JP | 2002090536 A | 3/2002 |
| JP | 2007232792 A | 9/2007 |
| JP | 2009048145 | 3/2009 |

OTHER PUBLICATIONS

Office Action from Japanese Application No. 2009-095168, dated Dec. 4, 2012.

* cited by examiner

*Primary Examiner* — Kyung H Shin
(74) *Attorney, Agent, or Firm* — Lerner, David, Littenberg, Krumholz & Mentlik, LLP

(57) ABSTRACT

A liquid crystal shutter includes a plurality of liquid crystal layers arranged in a light-incident direction; and a plurality of polarizers attached to each of the plurality of liquid crystal layers, polarization axes of 2 adjacent polarizers that have a liquid crystal layer therebetween being crossed at an angle of 90°, the accumulated value of degrees of polarization of polarizers that have polarization axes in a first direction being identical to that of degrees of polarizations of polarizers that have polarization axes in a second direction that crosses the first direction at an angle of 90°.

15 Claims, 10 Drawing Sheets

LIQUID CRYSTAL SHUTTER AND IMAGE DISPLAY OBSERVATION SYSTEM

CROSS-REFERENCE TO RELATED APPLICATION

The present application claims priority from Japanese Patent Application No. JP 2009-095168 filed in the Japanese Patent Office on Apr. 9, 2009, the entire content of which is incorporated herein by reference.

BACKGROUND OF THE INVENTION

1. Field of the Invention

The present invention relates to a liquid crystal shutter and an image display observation system.

2. Description of the Related Art

Recently, a three-dimensional image display system has been developed, which displays images for right eye and left eye on a screen of display such as a liquid crystal display and makes viewers three-dimensionally recognize the images using three-dimensional eyeglasses. A method to obtain a three-dimensional image includes a time divisional shutter method, for example.

Japanese Unexamined Patent Application Publication Nos. 8-327949 and 9-113864 are examples of related arts.

SUMMARY OF THE INVENTION

However, in three-dimensional eyeglasses according to the related art, since light penetrates a liquid crystal shutter even when the liquid crystal shutter is closed, it was not possible to obtain a sufficient contrast between the open shutter state and closed shutter state. As a result, there occurred a problem of crosstalk in which an image for left eye and an image for right eye are mixed. Further, in the case that multiple liquid crystal layers are used so as to reduce the transmittance of light in the closed shutter state, there was a problem that weight of eyeglasses increased due to the multiple layers.

Therefore, it is desirable to provide a new or improved liquid crystal shutter and image display observation system which are capable of remarkably reducing the transmittance of light in the closed shutter state.

A liquid crystal shutter according to an embodiment of the invention includes a plurality of liquid crystal layers arranged in a light-incident direction, and a plurality of polarizers attached to each of the plurality of liquid crystal layers, polarization axes of 2 adjacent polarizers that have a liquid crystal layer therebetween being crossed at an angle of 90°, the accumulated value of degrees of polarization of polarizers that have polarization axes in a first direction being identical to that of degrees of polarizations of polarizers that have polarization axes in a second direction that crosses the first direction at an angle of 90°.

In the liquid crystal shutter according to an embodiment of the invention, the plurality of liquid crystal layers includes 2 liquid crystal layers, and the plurality of polarizers are disposed between surfaces of light incident side and discharging side of the 2 liquid crystal layers and the adjacent liquid crystal layers.

In the liquid crystal shutter according to an embodiment of the invention, the polarizer includes a polarizer film having a function to polarize light and a substrate material attached to the polarizer film, and the substrate material of the polarizer that is positioned between the plurality of liquid crystal layers is thinner than the substrate material of the polarizers positioned on the surface of the light-incident side or discharging side.

In the liquid crystal shutter according to an embodiment of the invention, the substrate material includes triacetylcellulose.

In the liquid crystal shutter according to an embodiment of the invention, the plurality of liquid crystal layers are driven such that a voltage application time to apply a voltage whose value is equal to or higher than that of a predetermined threshold voltage to the plurality of liquid crystal layers and a voltage application time to apply a voltage whose value is less than that of the predetermined threshold voltage are repeated in a predetermined period.

In the liquid crystal shutter according to an embodiment of the invention, the liquid crystal shutter includes shutters for right eye and left eye of liquid crystal shutter eyeglasses, and is driven such that the shutters for right eye and left eye are alternately open and shut in a predetermined period.

In the liquid crystal shutter according to an embodiment of the invention, the plurality of liquid crystal layers includes 2 liquid crystal layers, and open and shut timing of one of the liquid crystal layers is different from open and shut timing of the other liquid crystal layer.

In the liquid crystal shutter according to an embodiment of the invention, while one of the liquid crystal layer is in an open period, the other liquid crystal layer is open and shut.

A liquid crystal shutter according to another embodiment of the invention includes a plurality of liquid crystal layers arranged in a light-incident direction, a first polarizer that is disposed on surfaces of light incident side and light discharging side of the plurality of liquid crystal layers, and a second polarizer that is disposed between adjacent liquid crystal layers and includes a metal polarizer element.

In the liquid crystal shutter according to another embodiment of the invention, the liquid crystal layer includes a substrate having a transparent electrode installed thereon, and a transparent electrode of one liquid crystal layer of adjacent liquid crystal layers and a transparent electrode of the other liquid crystal layer are installed on the upper and bottom surfaces of the same substrate, respectively, between the adjacent liquid crystal layers, and the second polarizer is installed on the substrate.

In the liquid crystal shutter according to another embodiment of the invention, a polarization axis of the first polarizer and a polarization axis of the second polarizer are crossed at an angle of 90°, the accumulated value of degrees of polarization of the first polarizer that has the polarization axis in a first direction is identical to that of degrees of polarization of the second polarizer that has the polarization axis in a second direction that crosses the first direction at an angle of 90°.

In the liquid crystal shutter according to another embodiment of the invention, the plurality of liquid crystal layers are driven such that a voltage application time to apply a voltage whose value is equal to or higher than that of a predetermined threshold voltage to the plurality of liquid crystal layers and a voltage application time to apply a voltage whose value is less than that of the predetermined threshold voltage are repeated in a predetermined period.

In the liquid crystal shutter according to another embodiment of the invention, the liquid crystal shutter includes shutters for right eye and left eye of liquid crystal shutter eyeglasses, and is driven such that the shutters for right eye and left eye are alternately open and shut in a predetermined period.

In the liquid crystal shutter according to another embodiment of the invention, the plurality of liquid crystal layers includes 2 liquid crystal layers, and open and shut timing of one of the liquid crystal layers is different from open and shut timing of the other liquid crystal layer.

In the liquid crystal shutter according to another embodiment of the invention, while one of the liquid crystal layer is in an open period, the other liquid crystal layer is open and shut.

An image display observation system according to yet another embodiment of the invention includes a liquid crystal shutter including a plurality of liquid crystal layers arranged in a light-incident direction, and a plurality of polarizers attached to each of the plurality of liquid crystal layers, polarization axes of 2 adjacent polarizers that have a liquid crystal layer therebetween being crossed at an angle of 90°, the accumulated value of degrees of polarization of polarizers that have polarization axes in a first direction being identical to that of degrees of polarizations of polarizers that have polarization axes in a second direction that crosses the first direction at an angle of 90°, the liquid crystal shutter including shutters for right eye and left eye and being driven such that the shutters for right eye and left eye are alternately open and shut, and an image display device that alternately displays an image for right eye and an image for left eye, the image for right eye being displayed when the shutter for right eye is open and the shutter for left eye is shut, the image for left eye is displayed when the shutter for left eye is open and the shutter for right eye is shut.

An image display observation system according to yet another embodiment of the invention includes liquid crystal eyeglasses including a plurality of liquid crystal layers arranged in a light-incident direction, a first polarizer that is disposed on surfaces of light incident side and light discharging side of the plurality of liquid crystal layers and a second polarizer that is disposed between adjacent liquid crystal layers and includes a metal polarizer element, the liquid crystal shutter including shutters for right eye and left eye and being driven such that the shutters for right eye and left eye are alternately open and shut in a predetermined period, and an image display device that alternately displays an image for right eye and an image for left eye, the image for right eye being displayed when the shutter for right eye is open and the shutter for left eye is shut, the image for left eye is displayed when the shutter for left eye is open and the shutter for right eye is shut.

According to the invention, it is possible to provide a liquid crystal shutter and image display observation system capable of remarkably reducing transmittance of light in the closed shutter state.

DESCRIPTION OF THE PREFERRED EMBODIMENTS

Hereinafter, a preferred embodiment of the invention will be described with reference to accompanying drawings. Further, like symbols reference like elements in each drawing and the explanation thereof will be omitted.

Further, the description will be performed as follows.
1. First embodiment
(an example in which a plurality of liquid crystal cells are arranged, and degrees of polarization of polarizers are controlled)
    (1) Example of system configuration
    (2) Construction of liquid crystal shutter
    (3) Optimization of degree of polarization for liquid crystal shutter
    (4) Simulation result of transmittance by controlling degree of polarization
    (5) Making liquid crystal shutter lighter
2. Second embodiment
(an example in which a wire grid (metal polarization element) is used as a polarizer)
    (1) Construction of liquid crystal shutter
3. Third embodiment
(regarding a driving of liquid crystal shutter)
    (1). Regarding a crosstalk occurred by a response delay for switching of left and right images
    (2). Improvement obtained by changing duty ratio of liquid crystal shutter
    (3). Driving a liquid crystal shutter according to a third embodiment <1. First Embodiment>
[(1) Example of System Configuration]

Figure 1:
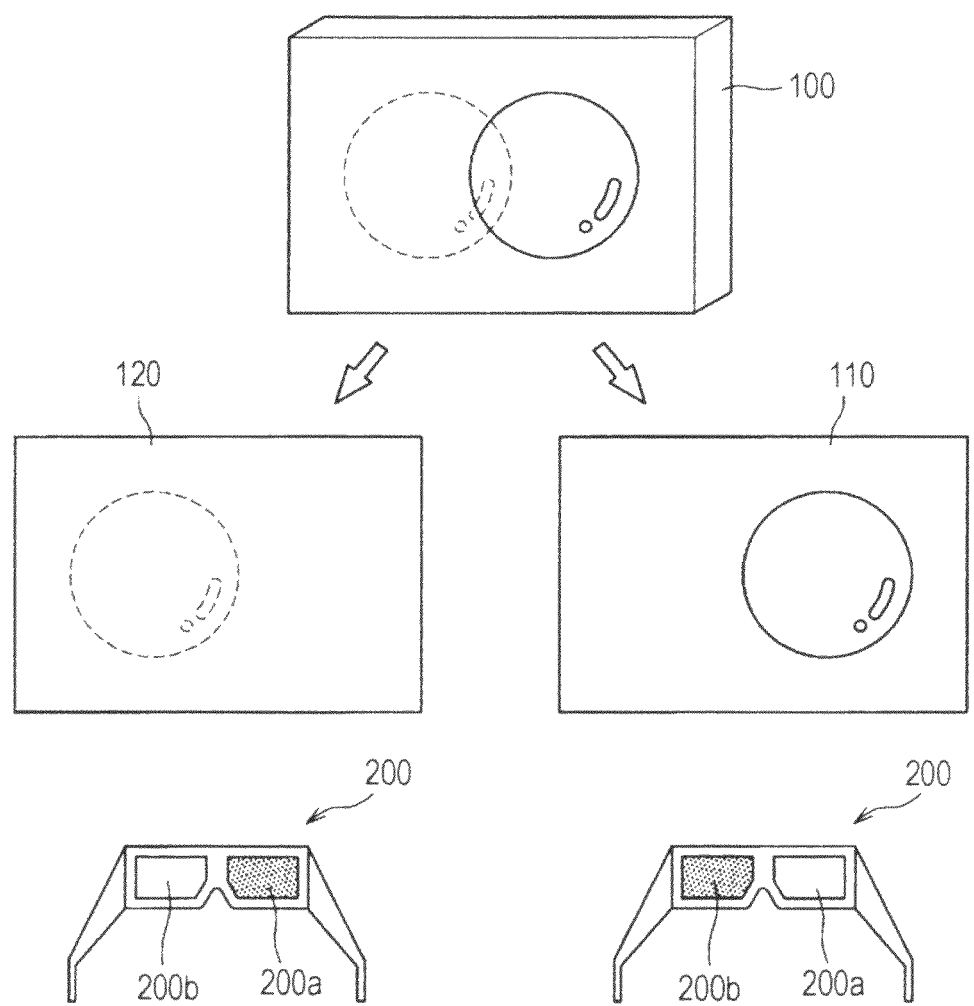
FIG. 1 is a mimetic diagram for illustrating a construction of a three-dimensional image display observation system according to an embodiment of the invention.

FIG. 1 is a mimetic diagram for illustrating a construction of a three-dimensional image display observation system according to an embodiment of the invention. Referring to FIG. 1, the system of the embodiment includes an image display apparatus 100 such as CRT and LCD, and display image observation eyeglasses 200.

The image display apparatus 100, for example, alternately displays an image for right eye 110 and an image for left eye 120 for each field. The display image observation eyeglasses 200 has a pair of liquid crystal shutters 200a and 200b installed on portions corresponding to lenses. The liquid shutters 200a and 200b alternately perform open and shut operations synchronously with image changing for each field of the image display apparatus 100. That is, at the field in which the image for right eye 110 is displayed on the image display apparatus 100, the liquid crystal shutter 200b for left eye is in a shut state and the liquid crystal shutter 200a for right eye is in an open state. Further, at the field in which the image for left eye 120 is displayed, the reverse operation thereof is performed.

By performing such operations, a user who observes the image display apparatus 100 wearing the observation eyeglasses 200 receives the image for right eye 110 only on his or her right eye and the image for left eye 120 only on his or her left eye. Accordingly, images for right eye and left eye are synthesized in the internal part of the observer, and the image displayed on the image display apparatus 100 is recognized three-dimensionally.

[(2) Construction of Liquid Crystal Shutter]

Figure 2:
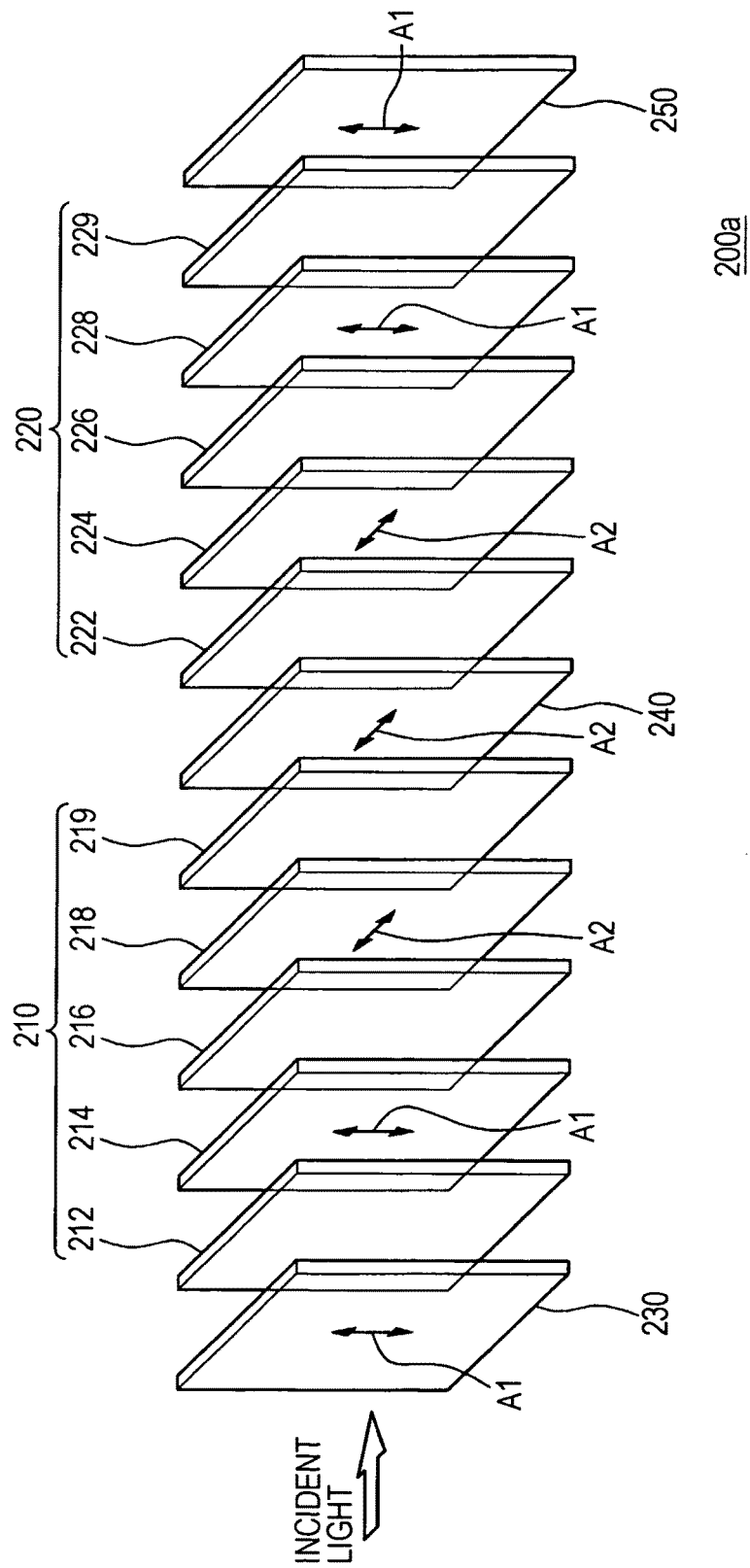
FIG. 2 is a mimetic diagram for describing a construction of a liquid crystal shutter.

Next, a construction of the liquid crystal shutters 200a and 200b is described. FIG. 2 is a mimetic diagram for describing a construction of the liquid crystal shutters 200a and 200b. Since the liquid crystal shutter 200a and the liquid crystal shutter 200b have same construction, a construction of the liquid crystal shutter 200a will be described below.

Referring to FIG. 2, the liquid crystal shutter 200a includes 2 liquid crystal cells 210 and 220 that are overlapped, a polarizer 230, a polarizer 240 and a polarizer 250. Generally, the liquid crystal shutters 200a and 200b are known in that a voltage whose value is equal to or higher than a threshold value is applied to a nematic liquid crystal at a fixed period, an open state in which transmittance of light is high and a shut state in which transmittance of light is low are alternately realized. The liquid crystal shutters 200a and 200b use this principle. The liquid crystal shutter 200a is inserted between a pair of transparent electrodes, and voltage is applied thereto by a transparent electrode formed on a transparent substrate. The polarizer 240 is arranged between the liquid crystal cells 210 and 220 that are overlapped. Further, the polarizers 230 and 250 are arranged on the surfaces of front side and rear side of the 2 liquid crystal cells 210 and 220, which are overlapped, respectively. Here, the polarizer 230 is arranged on the front side of the observation eyeglasses 200, that is, toward the image display apparatus 100, and the polarizer 250 is arranged toward the eyeball of the user.

The liquid crystal cell 210 includes a glass substrate 212, a transparent electrode (ITO) 214, a liquid crystal layer 216, a transparent electrode (ITO) 218, and a glass substrate 219. The liquid crystal cell 220 has the same construction as the liquid crystal cell 210, including a glass substrate 222, a transparent electrode (ITO) 224, a liquid crystal layer 226, a transparent electrode (ITO) 228, and a glass substrate 229.

The polarizers 230, 240 and 250 have a polarization axis (penetration axis) that has a predetermined direction. The polarization axis of the polarizer 230 is in an arrow A1 direction (up and down direction) in FIG. 1. Further, the polarization axis of the polarizer 240 is in an arrow A2 direction (horizontal direction) that is crossed with the arrow A1 direction at an angle of 90°. Further, the penetration axis of the polarizer 250 is in an arrow A1 direction (up and down direction).

The liquid crystal layers 216 and 226, for example, is constructed of nematic liquid crystal and used in STN mode and TN mode. In this embodiment, a case in which twist nematic (TN) type liquid crystal having a twist angle of 90° is used is exemplified. In the liquid crystal cell 210, the transparent electrode 214 is deposited on the glass substrate 212 and the transparent electrode 218 is deposited on the glass substrate 219. A horizontally oriented film (not shown) is formed on each of the transparent electrodes 214 and 218 such that the horizontally oriented films are facing each other with the liquid crystal layer 216 inserted therebetween, and a rubbing process is performed on the oriented film in a predetermined direction. Further, liquid crystal molecules of the liquid crystal layer 216 are twisted by force between the molecules at a predetermined angle (90°) between the oriented films when voltage is not applied. In this embodiment, the rubbing direction of the transparent electrode 214 in the light incident side is identical to the polarization axis direction (arrow A1 direction) of the polarizer 230, and the rubbing direction of the transparent electrode 218 in the light discharging side is identical to the polarization axis direction (arrow A2 direction) of the polarizer 240.

As such, in the liquid crystal cell 220, the transparent electrode 224 is deposited on the glass substrate 222 and the transparent electrode 228 is deposited on the glass substrate 229. A horizontally oriented film (not shown) is formed on each of the transparent electrodes 224 and 228 such that the horizontally oriented films are facing each other with the liquid crystal layer 226 inserted therebetween, and a rubbing process is performed on the oriented film in a predetermined direction. Further, liquid crystal molecules of the liquid crystal layer 226 are twisted by force between the molecules at a predetermined angle (90°) between the oriented films when voltage is not applied. The rubbing direction of the transparent electrode 224 in the light incident side of the liquid crystal cell 220 is identical to the polarization axis direction (arrow A2 direction) of the polarizer 240, and the rubbing direction of the transparent electrode 228 in the light discharging side is identical to the polarization axis direction (arrow A1 direction) of the polarizer 250.

In the liquid crystal cell 210, liquid crystal molecules of the liquid crystal layer 216 are twisted by force between the molecules at a predetermined angle (90°) when voltage is not applied between the transparent electrodes 214 and 218. In this state, near the transparent electrode 214, the liquid crystal molecules are oriented such that their long axes are directed to the rubbing direction of the oriented film of the transparent electrode 214. Further, near the transparent electrode 218, the liquid crystal molecules are oriented such that their long axes are twisted from the orientation at an angle of 90° near the transparent electrode 214 and are directed to the rubbing direction of the transparent electrode 218.

As such, in the liquid crystal cell 220, the liquid crystal molecules of the liquid crystal layer 226 are twisted by force between the molecules at a twist angle of 90° when voltage is not applied between the transparent electrodes 224 and 228. In this state, near the transparent electrode 224, the liquid crystal molecules are oriented such that their long axes are directed to the rubbing direction of the oriented film of the transparent electrode 224. Further, near the transparent electrode 228, the liquid crystal molecules are oriented such that their long axes are twisted from the orientation near the transparent electrode 224 at an angle of 90° and directed to the rubbing direction of the oriented film of the transparent electrode 228.

In the case that the image display apparatus 100 is constructed of LCD or the same like this embodiment, light discharging from the image display apparatus 100 generally becomes polarized light, and its polarization axis is directed to the arrow A1 direction. Accordingly, the light discharged from the image display apparatus 100 that has polarization characteristic of the arrow A1 direction (up and down direction) in FIG. 2 penetrates the polarizer 230. Further, in the state that voltage is not applied between the transparent electrodes 214 and 218 and between the transparent electrodes 224 and 228, since liquid crystal molecules of the liquid crystal layer 216 are twisted at an angle of 90°, the light discharged from the image display apparatus 100 responds to the twist so that the polarization direction to be propagated rotates at an angle of 90°. Accordingly, the light discharged from the image display apparatus 100 penetrates the polarizer 240. Since the liquid crystal molecules of the liquid crystal layer 226 are twisted at an angle of 90°, the light that has penetrated the polarizer 240 responds to the twist so that the polarization direction to be propagated rotates at an angle of 90°, and penetrates the polarizer 250. Accordingly, the user who wears the observation eyeglasses 200 can visually recognize the light discharged from the polarizer 250, and can visually recognize the image of the image display apparatus 100. As such, in the observation eyeglasses 200 of this embodiment, a state in which the liquid crystal cells 210 and 220 penetrate the light from the image display apparatus 100 (normally white) is realized when voltage is not applied.

Meanwhile, when voltage whose value is equal to or higher than a threshold value is applied between the transparent electrodes 214 and 218 and between the transparent elements 224 and 228, the liquid crystal molecules are oriented such that their long axes are directed in the electric field direction if dielectric anisotropy of the liquid crystal is positive ($\Delta\epsilon>0$). In this state, since liquid crystal molecules in the liquid crystal layers 216 and 226 are not twisted, polarization axes of the polarizers 230, 240 and 250 are kept with respect to the light incident from the image display apparatus 100. Since the transmission axes of the polarizers 230, 240 and 250 are changed by 90° from the image display apparatus 100 side, while the light incident from the image display apparatus 100 can penetrate the polarizer 230, it does not penetrate the polarizer 240 located in the backward area. Further, even though some of incident light penetrated the polarizer 240, since the penetration axis of the polarizer 250 located in the more backward area is deviated at an angle of 90°, the light does not penetrate the polarizer 250. As such, in the observation eyeglasses 200 of this embodiment, it is possible to suppress penetration of light incident from the image display apparatus 100 by the polarizers 230, 240 and 250 whose penetration axes are changed by 90° in the state that voltage is applied. Accordingly, it is possible to realize an open shutter state in which light penetration ratio is high and a closed shutter state in which light penetratin ratio is low using the change of oriented state of liquid crystal molecules caused by applying voltage between the transparent electrodes 214 and 218 and between the transparent electrodes 224 and 228. Further, in this description and drawings, the light penetration ratio in the closed shutter state is referred to as a black penetration ratio, and the light penetration ratio in the open shutter state is referred to as a white penetration ratio.

Here, in the case that observation eyeglasses are constructed of 1 sheet of liquid crystal cell, there is a case that it is not possible to sufficiently reduce the penetration ratio of light when voltage is applied. In this case, an image blocked in the closed shutter state penetrates the liquid crystal cell, and especially in the case that liquid crystal shutter is used in the observation eyeglasses of three-dimensional image like this embodiment, there is occurred a crosstalk in which the image for right eye 110 and the image for left eye 120 are mixed.

In this embodiment, 2 sheets of liquid crystal cell 210 and 220 are overlapped, and 1 sheet of liquid crystal cell 210 has another 1 sheet of liquid crystal cell 220 stacked thereon. By doing this, since it is possible to block light to penetrate in both liquid crystal cells 210 and 220, it is possible to reduce the black penetration ratio compared with the case of 1 sheet of liquid crystal cell. Further, since the polarization axis of first sheet of liquid crystal cell 210 regarding discharging side and the polarization axis of second liquid crystal cell 220 regarding incident side are in the same direction (arrow A2 direction), it is possible to suppress loss of the penetration ratio at white indication to the minimum. Further, as described above, the discharging light discharged from the image display apparatus 100 is generally polarized light, and its polarization axis is in the arrow A1 direction in FIG. 1. Accordingly, it is possible to suppress the loss of penetration ratio at the open shutter state to the minimum by combining the polarization axis of the general polarization light discharged from the image display apparatus 100, the polarization axis of the first sheet of polarizer 230, and the polarization axis of the first sheet of the liquid crystal cell 210 in the incident side.

[(3). Optimization of Degree of Polarization for Liquid Crystal Shutter]

Next, in the liquid crystal shutters 200a and 200b constructed as described above, a construction in which degrees of polarization of each polarizers 230, 240 and 250 are optimally adjusted will be described.

As described above, it is possible to suppress the black penetration ratio when voltage is applied by arranging 2 sheets of liquid crystal cells 210 and 220, crossing the penetration axis of the polarizer 230 and the penetration axis of the polarizer 240 at an angle of 90°, and crossing the penetration axis of the polarizer 240 and the penetration axis of the polarizer 250 at an angle of 90°.

In this embodiment, the black penetration ratio is remarkably reduced by optimizing degrees of polarization of the polariers 230, 240 and 250 in the up and down direction (arrow A1 direction) and in the horizontal direction (arrow A2 direction) in addition to this construction. Hereinafter, a method of optimizing degree of polarization will be described in detail.

For the method of optimizing degree of polarization, in this embodiment, an adjustment is performed to make the accumulated value of degree of polarization of the polarizer whose penetration axis is in the up and down direction identical to the accumulated value of degree of polarization of the polarizer whose penetration axis is in the horizontal direction. Since the polarizer whose penetration axis is in the up and down direction is the polarizers 230 and 250 and the polarizer whose penetration axis is in the horizontal direction is the poloarizer 240, degrees of each polarizers 230, 240 and 250 are adjusted in order to make sum of degrees of the polarizers 230 and 250 identical to the degree of the polarizer 240.

As a concrete example of adjustment method, polarizers are overlapped for each polarization axis and the degree of polarization on each polarization axis is measured. Further, the degree of polarization of polarizer in each polarization axis is set such that degrees of polarization of the polarizers with respect to light incident from front side are roughly identical to each other. For example, the polarizers 230 and 250 that have the polarization axis in the up and down direction are overlapped to measure their degrees of polarization, and degree of the polarizer 240 having the polarization axis in the horizontal direction is measured on the other hand. Further, thickness and material of each polarizer 230, 240 and 250 are determined in order to make both of measurements identical each other. In case that the polarizers are of same kind and material, it is theoretically possible to obtain same degree of polarization by making accumulated value of thicknesses of polarizer films in each polarization axis same when the polarizers have same kind and material. That is, it is desirable that sum of thicknesses of polarizer films of the polarizers 230 and 250 is identical to that of the polarizer film of the polarizer 240.

Further, in the case that polarizers are constructed of different material, there is a possibility that their characteristics are different one another due to their wavelengths, but it is desirable that degrees of polarization for each polarizer are near wavelength of 550 nm (maximum value of y of luminosity factor function) that especially contributes to brightness. In each case too, degree of polarization for each polarization axis is measured and material and thickness of the polarizers are set to make accumulated values of degrees of polarization for each polarization axis identical each other.

Generally, it is possible to perform a measurement of penetration ratio or degree of polarization of polarizer using a spectroscope. Measurement of penetration ratio or degree of polarization of polarizer can be performed using a phase difference measurement apparatus "KOBRA" made in OUJI MEASURING EQUIPMENT Co. or the same, for example.

measured using the phase difference measurement apparatus uses a rotational light analyzer method that uses a light analyzer The case that penetration ratio of polarizer is of measuring system, and is performed for a plurality of specific wavelengths included in the apparatus. In describing an example of a method of measuring penetration ratio of polarizer, if strength of penetrated light is I(θ) when a rotational angle of light analyzer is θ, it is possible to express I(θ) using following expression (1).

$$I(\theta)=(I0/2)[(Tpy \cdot Tsy + Tpx \cdot Tsx) \cos 2(\theta-\Phi)+(Tpy \cdot Tsx + Tpx \cdot Tsy) \sin 2(\theta-\Phi)] \quad (1)$$

wherein, for expression (1),
- I0: strength of penetrated light when there is no sample
- θ: rotational angle of light analyzer
- Tpx, Tpy: penetration ratios of light analyzer in the directions of penetration axis and absorption axis
- Tsy, Tsx: penetration ratios of sample in the directions of penetration axis and absorption axis
- Φ: orientation of penetration axis of sample Values of Tpy, Tpy are investigated in advance for each measured wavelength and set as device integers. Further, orientation of the light analyzer is changed using θ=0, 30, 60, 90, 120, 150 and volume of light I(θi) is detected with each orientation.

Further, using values of discreet 6 points of figure of strength of penetrated light, a numerical arithmetic operation is performed using the expression (1), and Tsy, Tsx and Φ to be obtained by curve fitting are determined.

Further, single penetration ratio Tm, parallel penetration ratio Tp, orthogonal penetration ratio Tc and degree of polarization V are expressed with following expressions (2), expression (3) and expression (4) and expression (5).

$$Tm=(Tsy+Tsx)/2 \quad (2)$$

$$Tp=(Tsy2+Tsx2)/2 \quad (3)$$

$$Tc=Tsy \cdot Tsx \quad (4)$$

$$V=\sqrt{[(Tp-Tc)/(Tp+Tc)]} \quad (5)$$

In this embodiment, suppressing the black penetration ratio to the minimum can be realized by making sum of degrees of polarization of polarizers 230 and 250 that have polarization axis in the up and down direction identical to degree of polarization of the polarizer 240 that has polarization axis in the horizontal direction. Here, as an example of method to make the sum of degrees of polarization of the polarizers 230 and 250 identical to degree of polarization of the polarizer 240, the polarizer 230 has the same construction as the polarizer 250, and the polarizer 240 is constructed of same 2 polarizers overlapped, each of them being identical to the polarizer 230 (polarizer 250). By doing this, it is possible to make the sum of degrees of polarization of the polarizers 230 and 250 that have the polarization axis in the up and down direction identical to the degree of polarization of the polarizer 240 that has the polarization axis in the horizontal direction.

Further, it is also desirable to make the sum of degrees of polarization of the polarizers 230 and 250 identical to the degree of polarization of the polarizer 240 by measuring the sum of degrees of polarization of the polarizers 230 and 250 having a polarization axis in the up and down direction, and adjusting thickness and material of the polarizer 240 using the measured sum.

[(4). Simulation Result of Transmittance by Controlling Degree of Polarization]

Figure 3:
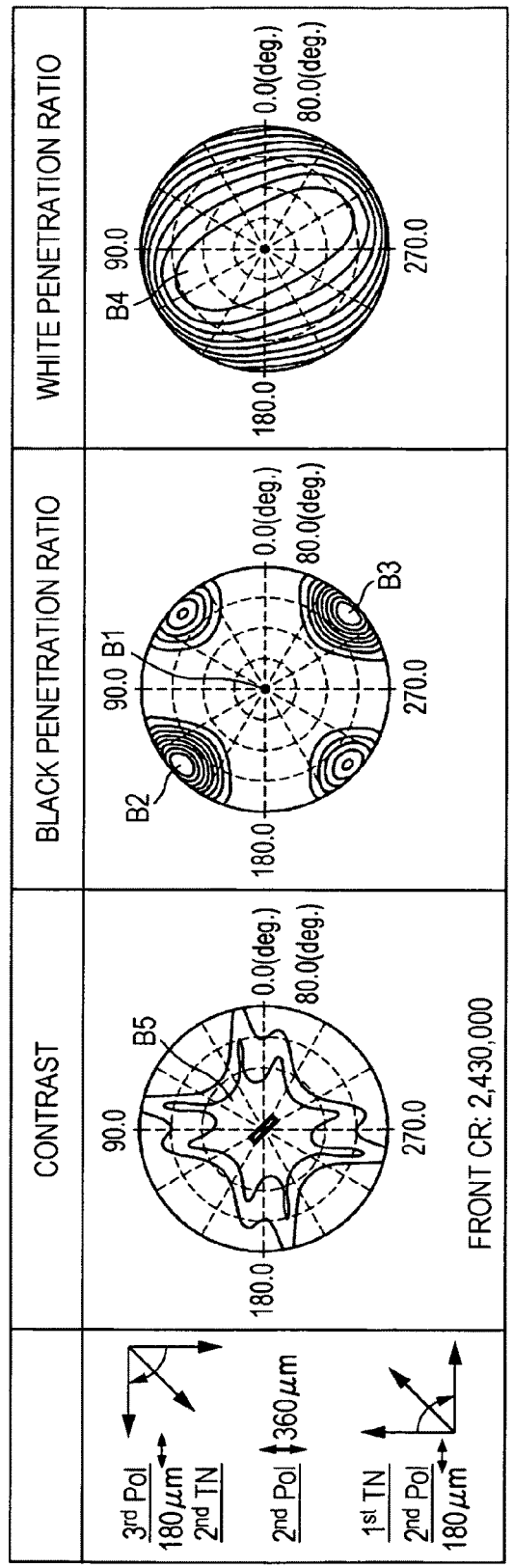
FIG. 3 is characteristic diagrams for describing an effect of reducing a black transmittance by controlling degree of polarization, which illustrates a simulation result of the transmittance.
Figure 4:
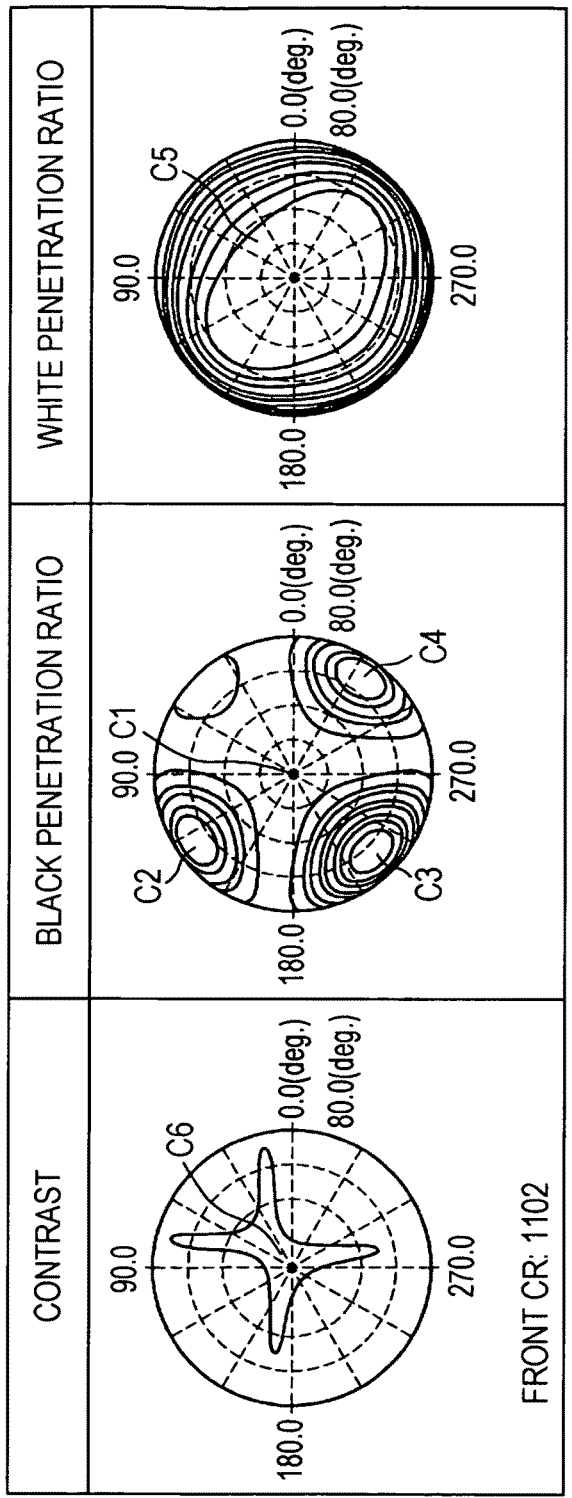
FIG. 4 is characteristic diagrams for describing an effect of reducing a black transmittance by controlling degree of polarization, which illustrates a simulation result of the transmittance.
Figure 5:
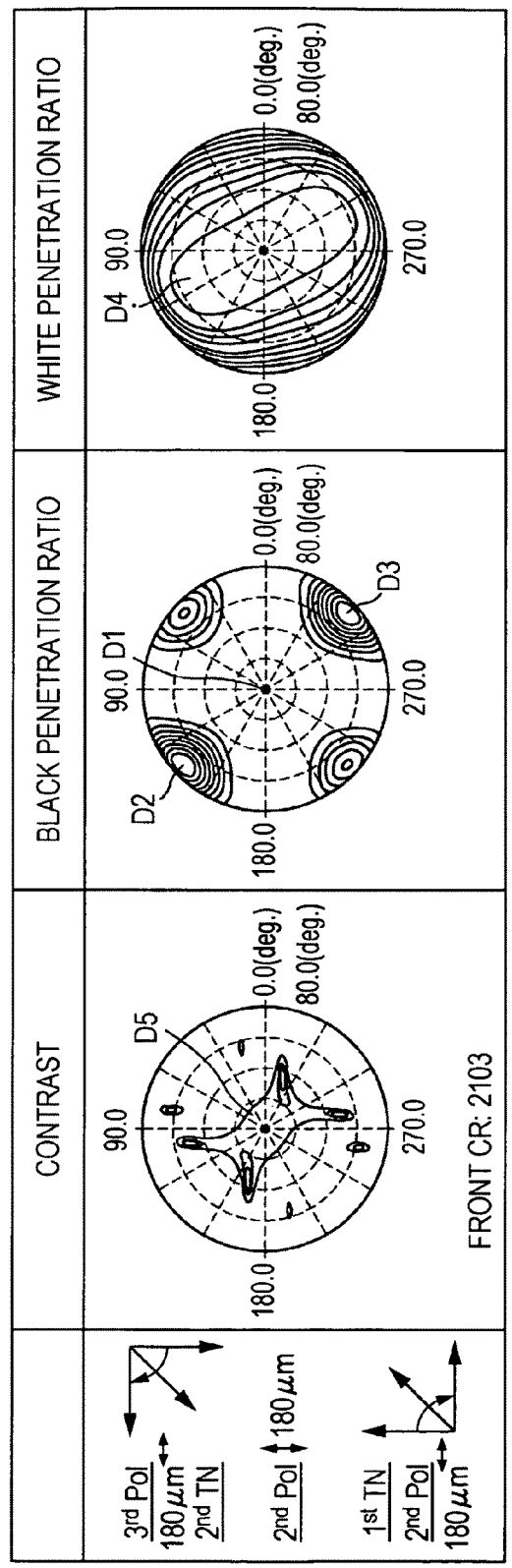
FIG. 5 is characteristic diagrams for describing an effect of reducing a black transmittance by controlling degree of polarization, which illustrates a simulation result of the transmittance.

FIGS. 3, 4 and 5 are characteristic diagrams for describing effects of reduction of black penetration ratio by adjusting degree of polarization, and illustrating simulation results of penetration ratio. Here, FIG. 3 illustrates a black penetration ratio, a white penetration ratio and a contrast that is a ratio of the white penetration ratio to the black penetration ratio obtained by constructing the liquid crystal shutters 200a and 200b of this embodiment. For the polarizers 230 and 250, a product number G1220DU (thickness of 180 μm) made in NITTOU TENKOU Co. is used. Further, for the polarizer 240, 2 sheets of polarizer that is the same as the polarizer 230 (polarizer 250) are overlapped and used. Accordingly, thickness of the polarizer 240 is 360 μm.

Further, FIGS. 4 and 5 illustrate comparative examples for this embodiment, and FIG. 4 illustrate a simulation result obtained by a liquid crystal shutter that is constructed of a sheet of liquid crystal cell and polarizers that are arranged on both sides of the liquid crystal cell and whose penetration axes are crossed at an angle of 90°. The polarizers are the same as in FIG. 3, and a product number G1220DU made in NITTOU TENKOU Co. is used for the polarizers.

Further, FIG. 5 illustrates the case that 2 sheets of liquid crystal cells 210 and 220 are used similarly to this embodiment and 3 polarizers 230, 240 and 250 are used, and the polarizers 230 and 250 are constructed of the same ones as FIG. 3. Meanwhile, the polarizer 240 is different from that of FIG. 3 and constructed of only 1 sheet of the product number G1220DU made in NITTOU TENKOU Co.

In characteristic of the simulation illustrated in FIGS. 3, 4 and 5, the penetration ratio is indicated by characteristic curves in which points of same penetration ratio are connected in the circles illustrating the results. Here, the center of circle indicates penetration ratio of light incident from the front. Further, a visual angle for front direction becomes gradually larger as nearer to the circumference of the circle, and outer circumference of the circle illustrates the penetration ratio of light incident from the direction crossed with the front direction at an angle of 90°. Further, even in the characteristic of any one of black penetration ratio and white penetration ratio, the characteristic curve illustrates that the penetration ratio of light incident from the front (origin of the circle) is the highest and becomes gradually lower as nearer to the circumference. The same is true in the contrast, and the characteristic curve illustrates that the contrast in the front direction is the highest and becomes gradually lower as nearer to the circumference.

Further, for the simulation, LCDmaster 1D made in SIN-TECH Co. is used as a simulator. Further, a product number ZLI-4792 (Δn=0.094) (pretilt angle of 2°, twist angle of 90°) made in MERK Co. is used as the liquid crystal.

Since the white penetration ratio is not largely different in FIGS. 3, 4 and 5, hereinafter, the simulation result is considered based on the black penetration ratio and contrast. Referring to FIG. 4, while the black penetration ratio for light incident from the front (penetration ratio of C1 in FIG. 4) is nearly 0 in the case of 1 sheet of liquid crystal cell, the penetration ration becomes gradually lower as the visual angle becomes larger for light incident from the right-upper direction, left-lower direction, right-lower direction and left-lower direction. Especially, in the area C3 surrounded by the characteristic curve (visual angle of about 80° for light incident from the left-lower direction), the penetration ratio is equal to or higher than 20%, and it was not possible to sufficiently reduce the penetration ratio in a closed shutter state. In the same manner, even in the area C2 (visual angle of about 80° for light incident from the left-upper direction) and the area C4 (visual angle of about 80° for light incident from the right-lower direction), the penetration ratio is about 15%, and it was not possible to sufficiently reduce the penetration ratio in a closed shutter state. Accordingly, while the contrast (CR) that is a ratio of the white penetration ratio to the black penetration ratio is the highest in the area C6 that is surrounded by the characteristic curve, it was not possible to obtain the area that has a high contrast in a large scale. Further, even in the light incident from the front, the contrast is about CR=1102, and it was not possible to obtain a sufficient contrast.

Further, referring to FIG. 5, in the case that 2 sheets of liquid crystal cells 210 and 220 are arranged, even when, as an intermediate polarizer 240, only a sheet of polarizer that is the same as the polarizers 230 and 250 of both sides is used, the same tendency as FIG. 4 was shown. Referring to FIG. 5, while the black penetration ratio for the light incident from the front (penetration ratio for D1 in FIG. 5) nearly becomes 0, a result was obtained that the penetration ratio is reduced as the visual angle gradually becomes larger for the light incident from the right-upper direction, left-upper direction, right-lower direction and left-lower direction. Especially, in the area D2 (visual angle of about 80° for light incident from the left-upper direction) and the area D3 (visual angle of about 80° for light incident from the right-lower direction) surrounded by the characteristic curve, the penetration ratio becomes about 10%, and it was not possible to sufficiently reduce the penetration ratio in a closed shutter state. Accordingly, while the contrast (CR) that is a ratio of the white penetration ratio to the black penetration ratio is the highest in the area D5 surrounded by the characteristic curve, it was not possible to obtain the area that has a high contrast in a large scale. Further, even in the light incident from the front, the contrast is about CR=2103, and it was not possible to obtain a sufficient contrast.

Meanwhile, in an example of this embodiment illustrated in FIG. 3, 2 sheets of liquid crystal cells 210 and 220 are arranged, an intermediate polarizer 240 becomes the same as the polarizers 230 and 250 arranged on both sides and 2 sheets of the intermediate polarizer 240 are overlapped. According to this construction, sum of the degrees of polarization of the polarizers 230 and 250 that have a polarization axis in the up and down direction is identical to the degree of polarization of the polarizer 240 that has a polarization axis in the horizontal direction. According to such a construction, as illustrated in FIG. 3, the penetration ratio for the light incident from the front (penetration ratio for B1 in FIG. 3) nearly become 0, and a preferred result was obtained even in the case of large visual angle for the light incident from the right-upper direction, left-upper direction, right-lower direction and left-lower direction. In this case, a result of the highest penetration ratio was obtained in the area B2 (visual angle of about 80° for light incident from the left-upper direction) and the area B3 (visual angle of about 80° for light incident from the right-lower direction) surrounded by the characteristic curve, but its penetration ratio was less than 5%. Accordingly, the contrast (CR) that is a ratio of the white penetration ratio to the black penetration ratio becomes the highest in the area B5 surrounded by the characteristic curve, and it was possible to obtain the area that has a high contrast in a large scale. In the light incident from the front, a value of about CR=2,430,000 was obtained. Accordingly, a result was obtained that the contrast could be remarkably enhanced compared with the cases of FIGS. 4 and 5.

Here, as illustrated in FIG. 3, a reason why the black penetration ratio can be remarkably reduced by constructing the intermediate polarizer 240 with 2 same polarizers, each being identical to the polarizers 230 and 250 of both sides, will be described. It is suggested that a mixed light having a polarization axis in the vertical and horizontal directions passes through a first polarizer A that permits polarized light to be penetrated in the vertical direction (absorbs polarized light in the horizontal direction) and further passes through a second polarizer B that permits polarized light to be penetrated in the horizontal direction (absorbs polarized light in the vertical direction). At this time, when the second polarizer B is identical to the first polarizer A in the thickness, the light obtained by passing through the polarizers A and B is in the state that the polarized light of the vertical and horizontal directions is absorbed, and returns to the state of the mixed light that originally has the polarized axes in the vertical and horizontal directions (this state is referred to as a state 1).

Here, even though the mixed light of the state 1 is again caused to penetrate the polarizer C that has the same construction as the first sheet of the polarizer A (polarizer to penetrate the polarized light in the vertical direction, its thickness is identical to that of the polarizer A), the only light having a polarization axis in the horizontal direction is absorbed. Accordingly, as described in FIG. 5, it is not possible to sufficiently reduce the black penetration ratio.

Meanwhile, after the mixed light of the state 1 was obtained, it is suggested that a polarizer B' that penetrates the polarized light in the horizontal direction is overlapped and arranged in the rear half part of the second sheet of the polarizer B, and the polarizer C that penetrates the polarized light in the vertical direction (polarized light in the horizontal direction being absorbed) is arranged as a third sheet. Thicknesses of the polarizer B' and the polarizer C are suggested to be identical to those of the polarizer A and the polarizer B. In this case, when the mixed light of the state 1 is caused to penetrate the polarizer B' and the polarizer C, the polarized light in the vertical and horizontal directions is absorbed with these combination, so that the polarized light in the vertical can horizontal directions is absorbed from the mixed light of the state 1. Accordingly, as described in FIG. 3, it is possible to increase the contrast CR up to 2, 430,000.

Further, the penetration ratio in the open shutter state (white penetration ratio) is obtained as a preferable result in each of FIGS. 3, 4 and 5, and the result was that a penetration ratio of more than 25% was obtained in the area B4, C5 and D4 surrounded by the characteristic polarity.

From the result above, it was determined that the black penetration ratio could be remarkably reduced and the contrast could be remarkably increased by making the accumulated value of the degree of polarization in the up and down direction identical to the accumulated value of the degree of polarization in the horizontal direction.

[(5) Making Liquid Crystal Shutter Lighter]

Figure 6:
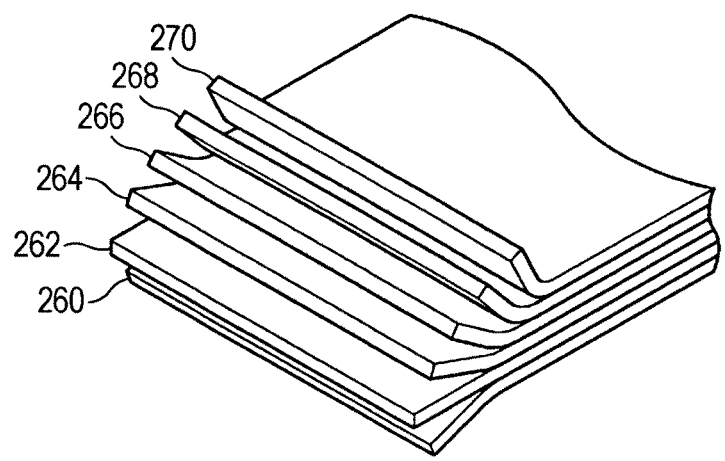
FIG. 6 is a mimetic diagram for showing an example of a construction of a polarizer.

Next, a construction to make the liquid crystal shutters 200a and 200b lighter will be described. FIG. 6 is a mimetic diagram for illustrating an example of a construction of polarizers 230, 240 and 250, illustrating a construction of a polarizer used generally. As illustrated in FIG. 6, the polarizers 230, 240 and 250 include a release film (PET) 260, an adhesive 262, a substrate film (TAC: Triacetylcellulose) 264, and a polarization film (PVA: polyvinyl alcohol) 266, starting from the bottom layer. Further, the polarizers 230, 240 and 250 include a substrate film (TAC) 268 and a protective film 270. Here, the polarization film 266 is a film that generates polarized light and has a relatively weak strength. Due to this, the substrate films 264 and 268 that are formed of triacetylcellulose and arranged on both sides of the polarization film 266 serve as basic material to reinforce the polarization film 266. Further, the adhesive 262 is an adhesive to be attached to a glass substrate 212, 219, 222 or 229, and is protected by the release film 260 when it is not used. Further, the protective film 270 is a film that is used to protect a surface of the substrate film 268 when it is not used. Accordingly, the polarizers 230, 240 and 250 include the adhesive 262, the substrate film 264, the polarization film 266 and the substrate film 268 in the state that they are attached to the glass substrate 212, 219, 222 or 229.

In this embodiment, the polarizer 240 is arranged between 2 sheets of liquid crystal cells 210 and 220, and is inserted therebetween so as to be supported thereby. Accordingly, although the substrate films 264 and 268 of the polarizer 240 are originally arranged as a strengthening agent to support the polarization film 266, since the polarizer 240 is supported between the liquid crystal cells 210 and 220, the reinforcement is less necessitated. Further, since the polarizer 240 is inserted between the liquid crystal cells 210 and 220, a protection of surface thereof being not exposed externally is not necessary. Accordingly, it is possible for the substrate films 264 and 268 of the polarizer 240 to be thin to the limit, compared with the polarizers 230 and 250.

As described above, the polarizer 240 can be constructed by overlapping 2 sheets that have the same function as the polarizer 230 or 250, in order to make degree of polarization of the polarizer 240 identical to those of polarizers 230 and 250. In this case, the polarizer 240 is constructed by overlapping 2 sheets, each sheet being identical to the construction of FIG. 6. Here, for each of the 2 sheets of polarizer that constructs the polarizer 240, the polarization film (PVA) 266 is constructed of the same material as the polarizer 230 (or polarizer 250). Further, the substrate films (TAC) 264 and 268 of the polarizer 240 are constructed of films that are thinner than the polarizer 230 (or polarizer 250). By doing this, it is possible to make shutters lighter in the liquid crystal shutters 200a and 200b including 2 sheets of liquid crystal cells 210 and 220.

Further, as described above, the polarizer 240 can be constructed by making degree of polarization of the polarizer 240 identical to sum of the degrees of polarization of the polarizers 230 and 250, which is obtained by optimizing material and thickness of the polarizer 240. In this case, the polarizer 240 can be constructed with a sheet of polarizer illustrated in FIG. 6. In this case, the polarizer film (PVA) 266 of the polarizer 240 is constructed such that it is different from the polarizer 230 or the polarizer 250 in material or thickness. In this case too, it is possible for the substrate films (TAC) 264 and 268 of the polarizer 240 to be thinner than the substrate films (TAC) 264 and 268 of the polarizer 230 or 250. Accordingly, it is possible to make the liquid crystal shutters 200a and 200b lighter.

According to the first embodiment described above, in the liquid crystal shutters 200a and 200b, the 2 liquid crystal cells 210 and 220 are overlapped, the polarizers 230 and 250 are arranged on both ends of the liquid crystal cells 210 and 220, and the polarizer 240 is arranged between the liquid crystal cells 210 and 220. Further, it is possible to remarkably reduce the penetration ratio of light in the closed state of the liquid crystal shutters 200a and 200b by optimally adjusting degrees of polarization of the polarizers 230 and 250 having penetration axes in the horizontal direction and degree of polarization of the polarizer 240 having penetration axes in the vertical direction. Accordingly, it becomes possible to remarkably enhance contrast in the open and closed shutter states, to suppress crosstalk occurred when image for right eye and image for left eye are mixed, and to provide a preferred three-dimensional image.

Further, the substrate films (TAC) 264 and 268 of the polarizer 240 arranged between 2 sheets of liquid crystal cells 210 and 220 become thinner than the substrate films (TAC) 264 and 268 of the polarizer 230 or the polarizer 250 arranged on both ends of them. Accordingly, it becomes possible to make the liquid crystal shutters 200a and 200b much lighter.

<2. Second Embodiment>

[(1) Construction of Liquid Crystal Shutter]

Figure 7:
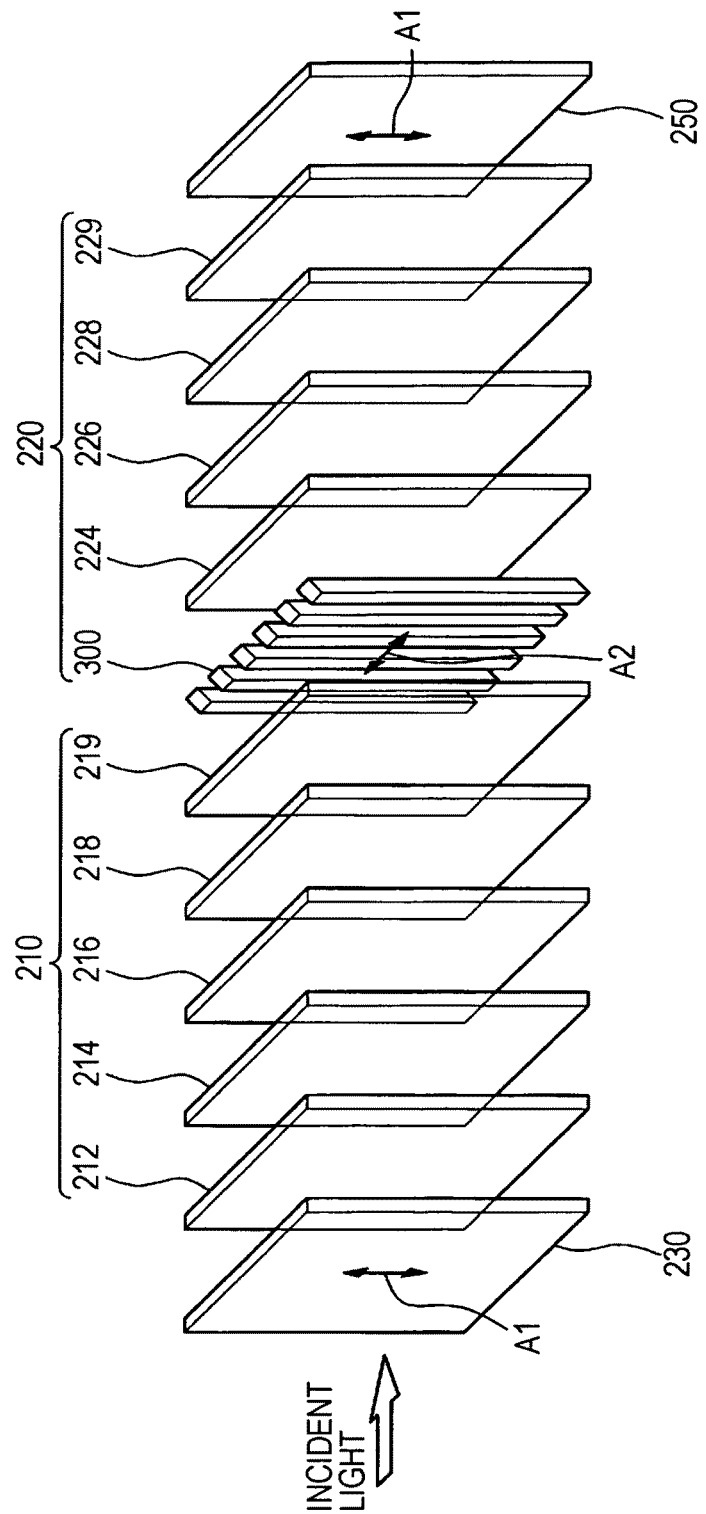
FIG. 7 is a mimetic diagram for describing a construction of a liquid crystal shutter according to a second embodiment.

Next, a second embodiment of the invention will be described. Since a construction of system according to the second embodiment is identical to that of the first embodiment, a description will be given mainly about the construction of the liquid crystal shutter here. FIG. 7 is a mimetic diagram for describing a construction of liquid crystal shutters 200a and 200b according to the second embodiment. Since a construction of the liquid crystal shutter 200a is identical to that of the liquid crystal shutter 200b, hereinafter, a construction of the liquid crystal shutter 200a will be described.

The main construction of the liquid crystal shutter 200a according to the second embodiment is identical to that of the liquid crystal shutter 200a according to the first embodiment, and it includes liquid crystal cells 210 and 220, a polarizer 230 and a polarizer 250.

Meanwhile, in the second embodiment, the polarizer 440 according to the first embodiment is not arranged and a wire grid 300 is arranged instead of the polarizer 440. Although the polarizer 440 according to the first embodiment is formed of organic material such as iodine or the like, the wire grid 300 is constructed of metal and is a polarization element having a function to polarize light. The wire grid 300 whose material is aluminum is formed on a glass substrate 219 of the liquid crystal cell 210. As the wire grid 300, polarizer filter "AsahiKASEI WGF" made in ASAHI KASEI Co. made by molding fine structure of aluminium can be used, for example. The wire grid 300 has a polarization axis in the horizontal direction (arrow A2 direction in FIG. 2) like the polarizer 400 according to the first embodiment. Accordingly, the open and closed shutter states that are realized by applying voltage thereto are the same as the first embodiment.

As illustrated in FIG. 7, a transparent electrode 214 of the liquid crystal cell 220 is formed on the glass substrate 219 having the wire grid 300 thereon through the wire grid 300. As such, in the second embodiment, it is possible to form the transparent electrode 226 directly on the wire grid 300 since the wire grid 300 is a heat-resistant metal. Accordingly, the liquid crystal cell 210 and the liquid crystal cell 220 can commonly use the glass substrate 219 and do not use the glass substrate 222 according to the first embodiment. Therefore, it is possible to construct the liquid crystal shutters 200a and 200b simpler, and to make the shutter lighter and thinner. Further, since a process to attach the polarizer 240 is not necessary and the glass substrate 222 is not necessary, it is possible to reduce a manufacturing cost.

<3. Third embodiment>
[(1) Regarding a Crosstalk Occurred by a Response Delay for Switching of Left and Right Images]

Next, a third embodiment of the invention will be described. The third embodiment relates to a driving of liquid crystal shutter according to the first and second embodiments. As described above, in a three-dimensional image display observation system, a crosstalk in which an image for right eye 110 and an image for left eye 120 are mixed occurs when the black penetration ratio becomes high in the closed shutter state.

Further, the image display device 100 side alternately changes the image for right eye 110 and the image for left eye 120 to be displayed, and crosstalk also occurs by a delay of response for change of the image for right eye 110 and the image for left eye 120 made by the image display apparatus 100.

For example, in the case that the image display apparatus 100 is constructed of liquid crystal display or the like, a response for change of the images is comparatively late. Further, in the image display apparatus 100, when the image for right eye 110 and the image for left eye 120 are changed, an up and down scan is performed so that an upper side of the display is affected by the next frame of image compared with the center of the display and a crosstalk easily occurs there. Meanwhile, a lower side of the display is affected by the previous frame of the image compared with the center of the display and a crosstalk easily occurs there.

Figure 8:
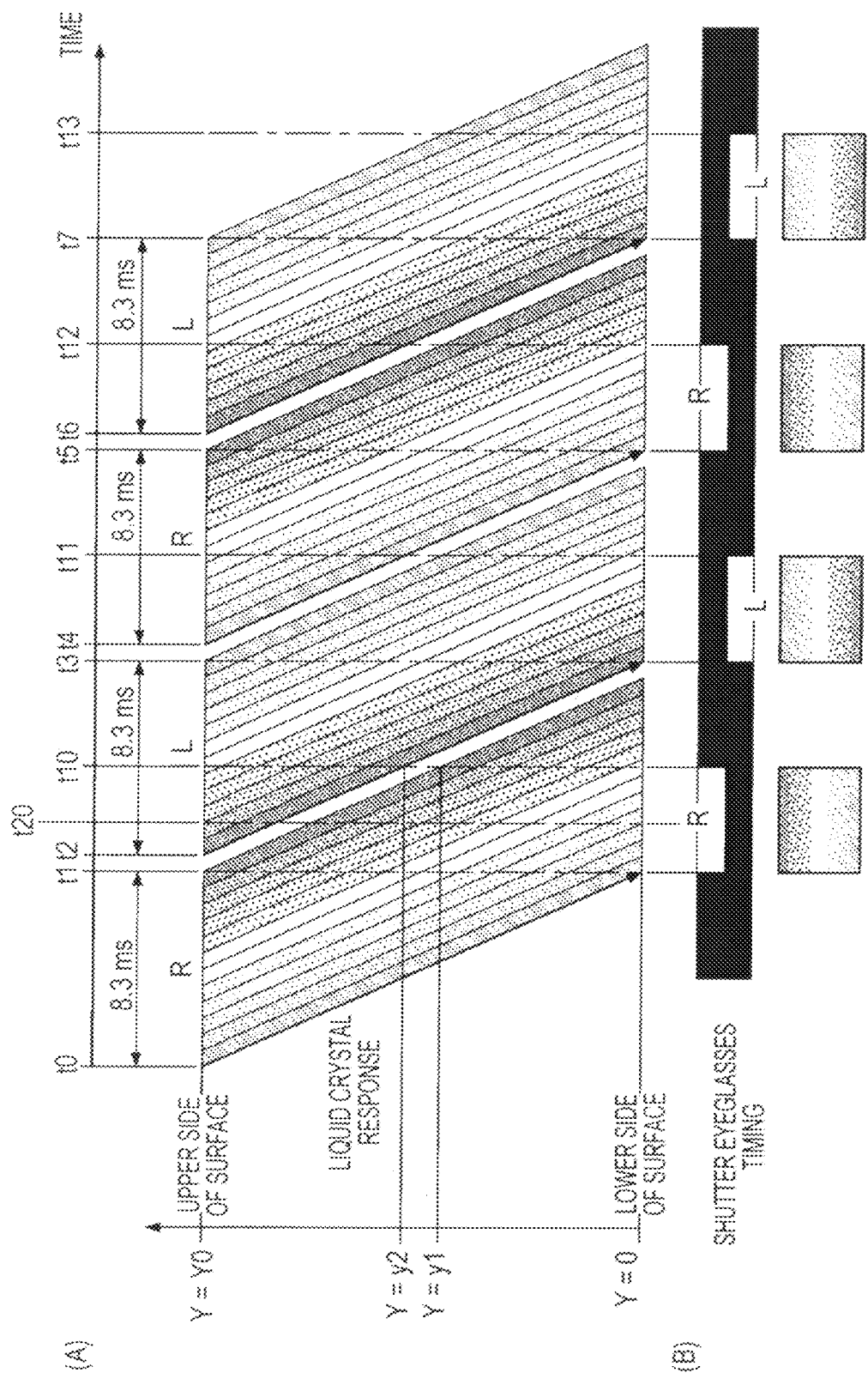
FIGS. 8A and 8B are views for describing a crosstalk occurred by a response delay for switching.

FIGS. 8A and 8B are views for describing a crosstalk occurred by a response delay of change and is a timing chart indicating left and right images displayed by the image display apparatus 100 and a timing of open and shut of the liquid crystal shutters 200a and 200b. FIGS. 8A and 8B illustrate the case that the image for right eye R and the image for left eye L are indicated at a driving frequency of 120[Hz], respectively and an interval to display the image for right eye R or the image for left eye L is 1/120[Hz]=8.3[ms].

In FIG. 8A, displaying is line-sequentially performed from an upper side (Y=Y0) of a liquid crystal display panel to a lower side (Y=0), and brightness changes with time in each position of the vertical direction from the upper side to the lower side.

As illustrated in FIG. 8A, the image for right eye R is displayed on the upper side of the screen (Y=Y0) from time t0 to t1, and the image for left eye L is displayed from time t2 to time t3 after a predetermined blank interval. In the same manner, the image for right eye R is displayed from time t4 to t5 and the image for left eye L is displayed from time t6 to t7.

Here, during the time t0 to t1 when the image for right eye R is displayed, on the basis of the upper side of the screen (Y=Y0), when the image for right eye R starts to display at the time t0, brightness of the upper side of screen increases with time, and a desired brightness is obtained at the time t1. As described above, since display is line-sequentially performed in the liquid crystal display panel from the upper side of the screen to the lower side, the time when the image for right eye R starts to display becomes later than the time t0 as the screen approaches to near the lower end of the screen, and the time when the image for right eye R ends to display also becomes later than the time t1.

In the same manner, during the time t2 to t3 when the image for left eye L is displayed, on the basis of the upper side of the screen (Y=Y0), when the image for left eye L starts to display at the time t2, brightness of the upper side of screen increases with time, and a desired brightness is obtained at the time t3. Even in the image for left eye L, the time when the image for left eye L starts to display becomes later than the time t2 as the screen approaches to near the lower end of the screen, and the time when the image for left eye L ends to display also becomes later than the time t3.

Referring to FIG. 8A, when the display is line-sequentially performed, since a response speed of liquid crystal is comparatively low, in writing of the image for right eye R, the upper side of the screen is in a state of starting to barely write when the upper side of the screen reaches to a desired brightness at time t1. Further, in writing of the image for left eye L too, the upper side of the screen is in a state of starting to barely write when the upper side of the screen reaches to a desired brightness at time t3.

FIG. 8B illustrates an open and shut timing of liquid crystal shutters 200a and 200b. Referring to FIG. 8B, the liquid crystal shutter for right eye R (liquid crystal 200a) is open between time t1 to t10 and between time t5 to t12. Further, the liquid crystal shutter for left eye L (liquid crystal shutter 200b) is open between time t3 to t11 and between time t7 to t13.

When the liquid crystal shutter 200a is open between time t1 to t10, since the image for right eye R is displayed at the timing when the liquid crystal shutter 200a is open in the area of the lower side of the screen (from Y=0 to Y=y1) illustrated in FIG. 8A, user's right eye visually recognizes the image for right eye R. However, in the area of Y>y2, the image for right eye R ends to display while the shutter 200a is open so that the next image for left eye L is displayed. Accordingly, in this area, an image of transitional state that is transited from the image for right eye R to the image for left eye L is recognized by the user. Further, near the lower side of the screen too (Y=0), when a transition from the image for left eye L to the image for right eye R is delayed, an image of transitional state that transits from the image for left eye L of the previous frame to the image for right eye R is recognized by the user. As described above, since the upper side of the display is affected by the image of the next frame and the lower side of the display is affected by the image of the previous frame compared with the center of the display, there occurs a crosstalk in which the image for right eye R and the image for left eye L are mixed and recognized to the user.

Further, near the lower side of the screen (Y=0), while the image for right eye R is displayed between the time t1 to t10, since the liquid crystal shutter 200a is open immediately after the display is started at the time t1, the liquid crystal is in the state that it does not respond sufficiently. Accordingly, the image that the user recognizes near the lower side of the screen (Y=0) is in the state that its brightness is not sufficiently high, and the user can not recognize the image having a desired brightness.

[(2) Improvement Obtained by Changing Duty Ratio of Liquid Crystal Shutter]

The effect of crosstalk in the upper side and lower side of the display due to the response delay can be reduced by making the duty ratio in the state that the liquid crystal shutters 200a and 200b are open small. For example, referring to FIGS. 8A and 8B, it is possible to suppress the crosstalk occurred at the upper side by making open period of the liquid crystal shutter 200a short and opening the liquid crystal shutter 200a between the time t1 to t20. Meanwhile, when the open period of the liquid crystal shutter 200a becomes short, it is not possible to obtain sufficient response time of the liquid crystal layer for the liquid crystal shutter 200a, and the brightness is reduced due to the fact the open period becomes short.

[(3) Driving a Liquid Crystal Shutter According to a Third Embodiment]

The liquid crystal shutter of the observation eyeglasses 200 according to the first and second embodiments include 2 liquid crystal cells 210 and 220 and as described above, can remarkably reduce the black penetration ratio. Due to this, in the third embodiment, for each of the 2 liquid crystal cells 210 and 220, duty ratios of open periods of the liquid crystal shutters 200a and 200b are made different each other.

Figure 9:
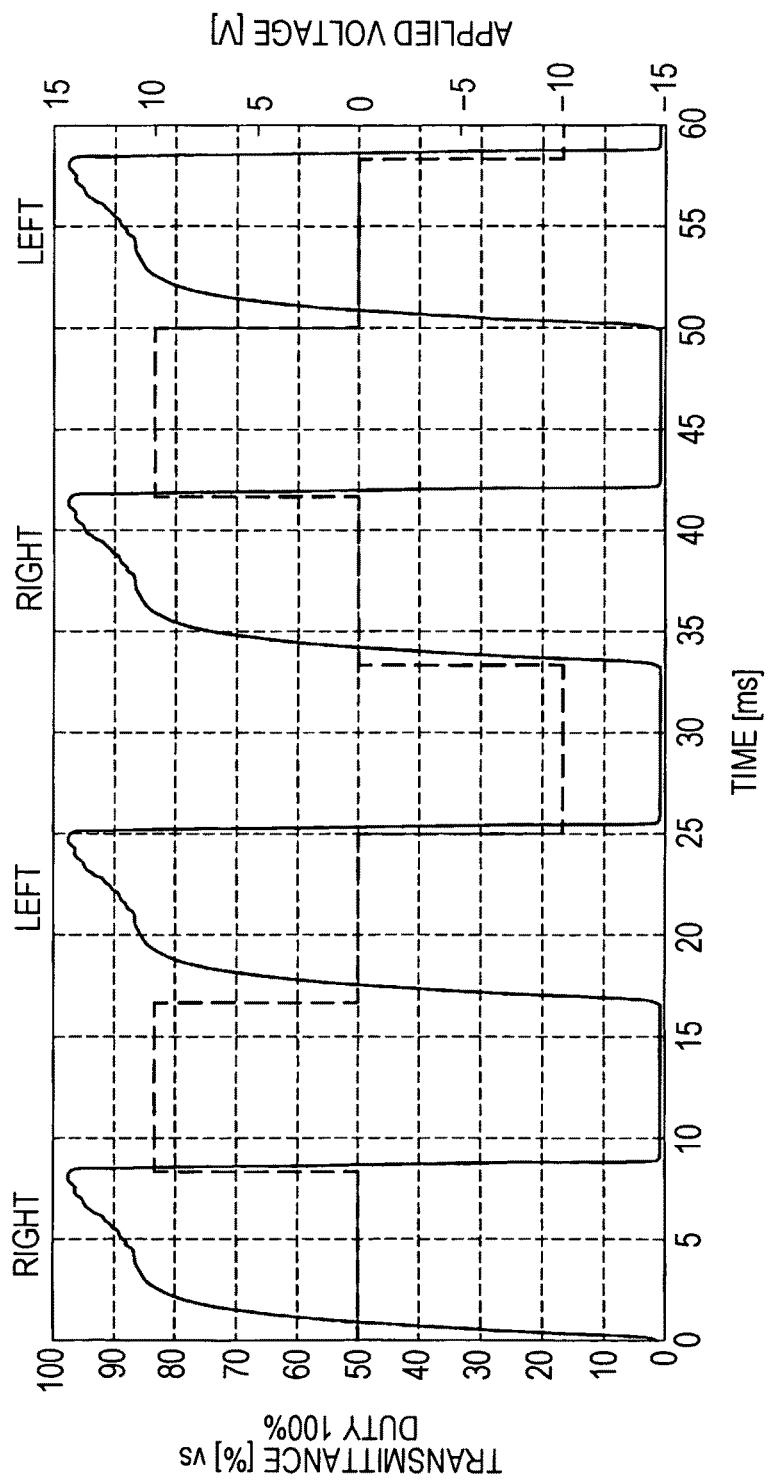
FIG. 9 is a characteristic diagram for illustrating voltage applied to a liquid crystal cell and a change of transmittance of liquid crystal cell.
Figure 10:
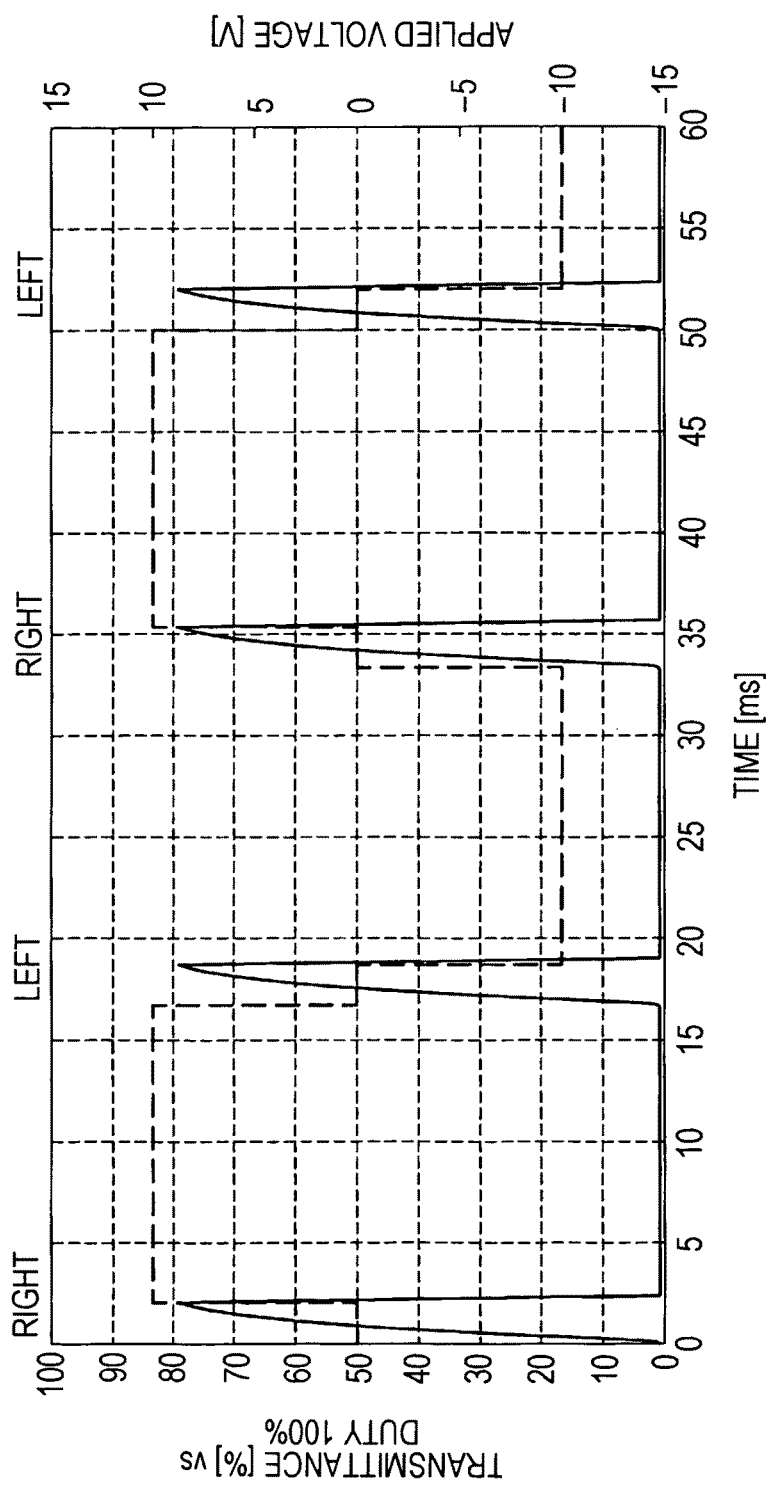
FIG. 10 is a diagram for illustrating voltage applied to a liquid crystal cell and a change of transmittance of liquid crystal cell, which is a characteristic diagram for illustrating a state that open and shut timing is different from that of FIG. 9.

FIGS. 9 and 10 are characteristic diagrams for illustrating change of voltages applied to the liquid crystal cells 210 and 220 (indicated in dotted line) and penetration ratios of the liquid crystal cells 210 and 220 (indicated in solid line). Here, FIG. 9 illustrates the case that the duty ratios of the open periods of the liquid crystal shutters 200a and 200b are 50%. Further, FIG. 10 illustrates the case that the duty ratio of the open periods of the liquid crystal shutters 200a and 200b are 12.5%. Referring to FIGS. 9 and 10, time axes (horizontal axes) of open and closed shutters correspond each other. Referring to each of FIGS. 9 and 10, voltages applied to the liquid crystal cells 210 and 220 become 0 in the open shutter period based on the characteristic of normally white, and become 10[V] or −10 [V] in the closed shutter period. Further, the penetration ratio of the liquid crystal cells 210 and 220 shows a ratio to the penetration ratio obtained in the case that the duty ratio of the open period is 100%.

In this embodiment, for example, the liquid crystal cell 210 of the image display apparatus 100 side is driven with the duty ratio of the open period, 50% as illustrated in FIG. 9. So, it is possible to open the shutter for a relatively long time correspondingly to the display of the image for right eye 110 or the image for left eye 120, and to suppress reduce of brightness of the image for right eye 110 and the image for left eye 120 to the minimum. Accordingly, it is possible for the user to visually recognize the image for right eye 110 and the image for left eye 120 that have high brightness.

Further, the liquid crystal cell 220 is driven with the duty ratio in the open period of 12.5% as illustrated in FIG. 10. The liquid crystal cell 220 is open in the open period of the liquid crystal cell 210, and its closing timing is set before closing timing of the liquid crystal cell 210. By doing this, it is possible to surely suppress the effect caused by the image of the next frame and previous frame and it is possible to surely suppress the crosstalk occurred by the response delay.

As described above, in the liquid crystal shutters 200a and 200b of the observation eyeglasses 200 having 2 liquid crystal cells 210 and 220, it is possible to surely suppress reduce of brightness by making the open and closed timing of each of the liquid crystal cells 210 and 220 different and by making the open period of one side of the liquid crystal cell 210 longer. Further, it is possible to surely suppress the crosstalk occurrence by making the open period of the other side of the liquid crystal cell 220 shorter.

Hereinbefore, although the preferred embodiments of the invention were described in detail with reference to the accompanying drawings, the invention is not restricted to related examples.

For example, while the liquid crystal layers 216 and 226 are used in TN mode, the invention is not restricted to the related example. For example, the liquid crystal layers 216 and 226 may be used in STN mode. Further, a homogeneous cell or the like may be used as the liquid crystal layers 216 and 226.

Further, in the first and second embodiments, although glass substrates 212, 219, 222 and 229 are used as substrate material of the liquid crystal cells 210 and 220, resin material such as plastic may be used as the substrate material. In this case, it is possible to use PC (Poly Carbonate), acryl, PET, PES (Polyethylenesulfone), COP, PI (Polyimides), for example, as the substrate material. By doing this, it is possible to make the liquid crystal shutters 200a and 200b lighter.

Further, 2 liquid crystal cells 210 and 220 are stacked in the first and second embodiments, it may be desirable to stack 2 or more liquid crystal cells It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal shutter comprising:
a plurality of liquid crystal layers arranged in a light-incident direction; and
a plurality of polarizers attached to each of the plurality of liquid crystal layers, respective polarization axes of the two adjacent polarizers that have the liquid crystal layers therebetween being crossed at an angle of 90°, the accumulated value of degrees of polarization of the polarizers that have a polarization axis in a first direction being identical to the accumulated value of degrees of polarization of the polarizers that have a polarization axis in a second direction that crosses the first direction at an angle of 90°,
wherein the polarizers are of the same kind and material, and the accumulated value of thickness of the polarizers that have a polarization axis in the first direction is equal to the accumulated value of thickness of the polarizers that have a polarization axis in the second direction.

2. The liquid crystal shutter according to claim 1,
wherein the plurality of liquid crystal layers includes two liquid crystal layers; and
wherein the plurality of polarizers are disposed between surfaces of a light incident side and a light discharging side of the two liquid crystal layers and the adjacent liquid crystal layers.

3. The liquid crystal shutter according to claim 1,
wherein the polarizer includes a polarizer film having a function to polarize light and a base material bonded to the polarizer film; and
wherein the base material of the polarizer that is positioned between the plurality of liquid crystal layers is thinner than the base material of the polarizer positioned on the surface of a light incident side or a light discharging side.

4. The liquid crystal shutter according to claim 3,
wherein the substrate material includes triacetylcellulose.

5. The liquid crystal shutter according to claim 1, wherein the plurality of liquid crystal layers are driven such that a voltage application time to apply a voltage whose value is equal to or higher than that of a predetermined threshold voltage and a voltage application time to apply a voltage whose value is less than that of the predetermined threshold voltage to the plurality of liquid crystal layers are repeated in a predetermined period.

6. The liquid crystal shutter according to claim 1, comprising shutters for right eye and left eye of liquid crystal shutter eyeglasses, the shutters for right eye and left eye being driven so as to open and close alternately in a predetermined period.

7. The liquid crystal shutter according to claim 6, wherein the plurality of liquid crystal layers includes two liquid crystal layers; and
wherein open and closing timing of one of the liquid crystal layers is different from open and closing timing of the other liquid crystal layer.

8. The liquid crystal shutter according to claim 7,
wherein while the one liquid crystal layer is in an open period, the other liquid crystal layer is open and closed.

9. A liquid crystal shutter comprising:
a plurality of liquid crystal layers arranged in a light incident direction;
a first polarizer that is disposed on surfaces of a light incident side and a light discharging side of the plurality of liquid crystal layers; and
a second polarizer that is disposed between adjacent liquid crystal layers and includes a metal polarizer element,
wherein a polarization axis of the first polarizer and a polarization axis of the second polarizer are crossed at an angle of 90°, the accumulated value of degrees of polarization of the first polarizer that has the polarization axis in a first direction is identical to that of degrees of polarization of the second polarizer that has the polarization axis in a second direction that crosses the first direction at an angle of 90°,
wherein the polarizers are of the same kind and material, and the accumulated value of thickness of the polarizers that have a polarization axis in the first direction is equal to the accumulated value of thickness of the polarizers that have a polarization axis in the second direction.

10. The liquid crystal shutter according to claim 9,
wherein the liquid crystal layer includes a substrate having a transparent electrode installed thereon; and
wherein a transparent electrode of one liquid crystal layer and a transparent electrode of the other liquid crystal layer are installed on the upper and bottom surfaces of the same substrate, respectively, between the adjacent liquid crystal layers, and the second polarizer is installed on the substrate.

11. The liquid crystal shutter according to claim 9, wherein the plurality of liquid crystal layers are driven such that a voltage application time to apply a voltage whose value is equal to or higher than that of a predetermined threshold voltage and a voltage application time to apply a voltage whose value is less than that of the predetermined threshold voltage to the plurality of liquid crystal layers are repeated in a predetermined period.

12. The liquid crystal shutter according to claim 9, wherein the liquid crystal shutter includes shutters for right eye and left eye of liquid crystal shutter eyeglasses, and is driven such that the shutters for right eye and left eye are alternately open and closed in a predetermined period.

13. The liquid crystal shutter according to claim 12,
wherein the plurality of liquid crystal layers includes
two liquid crystal layers; and
wherein open and closing timing of one of the liquid crystal layers is different from open and closing timing of the other liquid crystal layer.

14. The liquid crystal shutter according to claim 13,
wherein while the one liquid crystal layer is in an open period, the other liquid crystal layer is open and closed.

15. An image display observation system comprising:
liquid crystal eyeglasses having a liquid crystal shutter that includes a plurality of liquid crystal layers arranged in a light-incident direction, and a plurality of polarizers bonded to each of the plurality of liquid crystal layers, respective polarization axes of the two adjacent polarizers that have the liquid crystal layers therebetween being crossed at an angle of 90°, the accumulated value of degrees of polarization of the polarizers that have a polarization axes in a first direction being identical to the accumulated value of degrees of polarization of the polarizers that have a polarization axis in a second direction that crosses the first direction at an angle of 90°, and includes shutters for right eye and left eye being driven so as to open and close alternately; and
an image display device that alternately displays an image for right eye and an image for left eye, the image for right eye being displayed when the shutter for right eye is open and the shutter for left eye is closed, the image for left eye is displayed when the shutter for left eye is open and the shutter for right eye is closed,
wherein the polarizers are of the same kind and material, and the accumulated value of thickness of the polarizers that have a polarization axis in the first direction is equal to the accumulated value of thickness of the polarizers that have a polarization axis in the second direction.

* * * * *